Patented Feb. 17, 1931

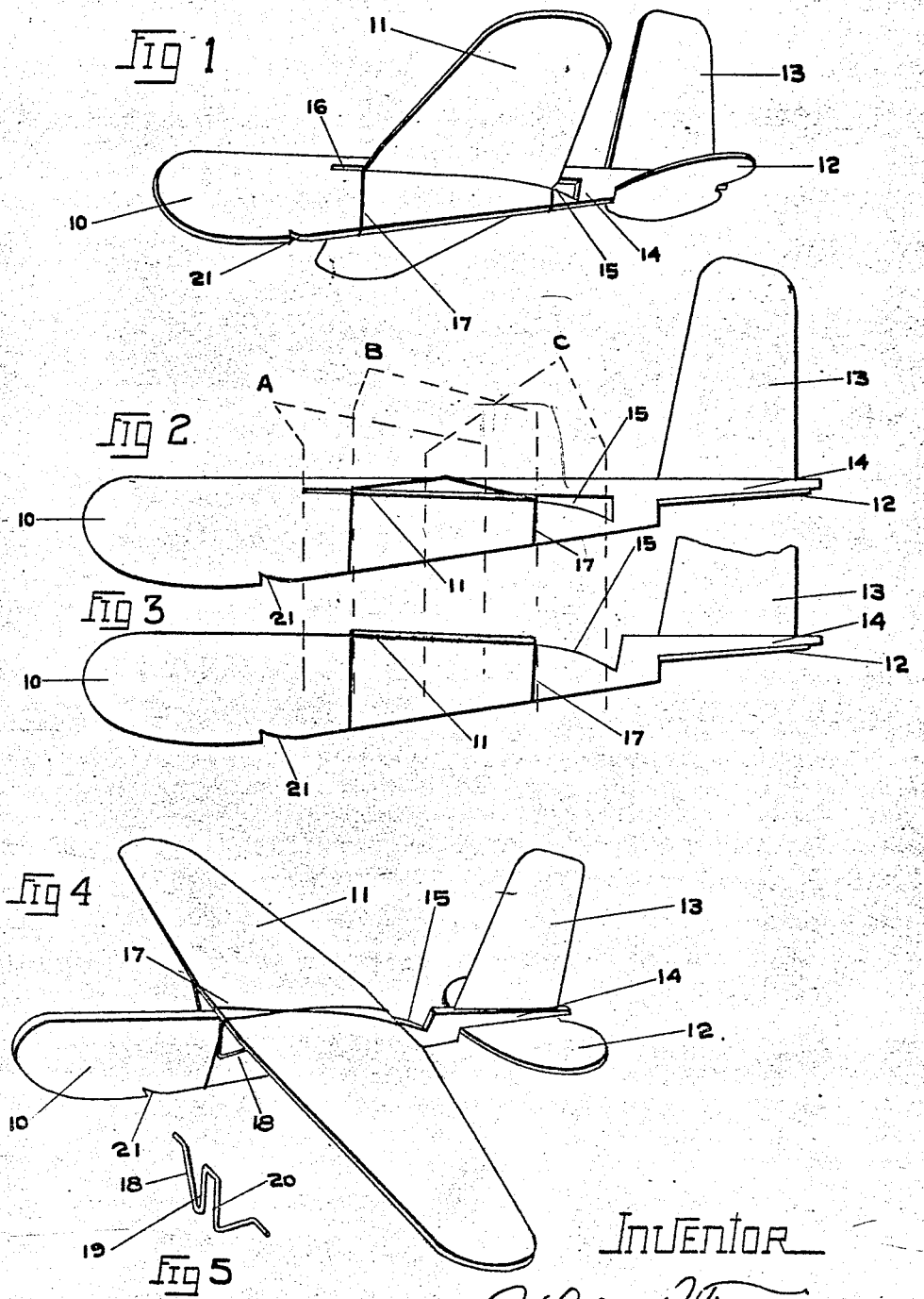

1,792,779

UNITED STATES PATENT OFFICE

PHILIP R. TARR, OF CUYAHOGA FALLS, OHIO

AIRCRAFT WITH ADJUSTABLE WING

Application filed May 12, 1930. Serial No. 451,647.

This invention relates to model aircraft, and particularly to model motorless gliders such as may simply be thrown into the air or projected with the aid of a rubber band or catapult.

Heretofore many types of toy gliders have been constructed, but most, if not all of these previously known gliders suffered from the disadvantage of lack of flexibility. That is, the gliders could readily be so constructed that they would soar smoothly, or so that they would dip and loop, or so that they would describe horizontal circles, but a glider capable of executing one type of flight could not ordinarily be adapted to perform in another way without entirely rebuilding it.

An object of this invention is accordingly to construct a model aircraft which is readily adjusted to various types of flight. A further object is to construct a model aircraft in which the curvature of the wing is automatically adjusted to compensate the effect of a shift in the position of the wing. Further objects will become evident from the following description.

This invention broadly includes aircraft having flexible wings adjustably secured to a curved surface of the fuselage, whereby a movement of the wing forward or backward on the fuselage will cause the angle of the wing, and particularly its curvature or camber, to be changed. The invention will be specifically described with reference to a preferred embodiment. In the drawings, Figure 1 represents a perspective view of a preferred embodiment of the invention viewed from below; Figure 2 represents a side view of the fuselage of the embodiment of Figure 1; Figure 3 represents a side view of the fuselage of another embodiment of the invention; Figure 4 represents a perspective view of the embodiment containing the fuselage of Figure 3; and Figure 5 represents a supporting member which is attached to the wing of Figure 5.

In Figure 1 the glider is shown as consisting of a fuselage 10, of a light, but rigid material, preferably of balsa wood of a thickness sufficient to support the wing firmly; a thin, flexible wing 11; an elevator 12; and a rudder 13. The wing, elevator, and rudder are preferably also made of balsa wood, but are much thinner than the fuselage, as they need not be as rigid as the latter. The elevator 12 and rudder 13 may be permanently fastened to the tail portion 14 of the fuselage 10, for example, by means of a strong waterproof cement. The wing 11, however, is not permanently fastened, but is held by frictional engagement with the lower curved surface 15 of the slot 16 somewhat to the rear of the center of gravity of the fuselage. For example, an endless rubber band 17 may be stretched over the top of the wing, 11, with its ends looped under the fuselage immediately in front of and behind the wing, its tension holding the wing firmly down against the surface 16 of the fuselage. Alternatively the slot 16 may be made throughout its length of just such a width as to accommodate the thickness of the wing 11, the wing then being held in place by the elasticity of the material of the fuselage and the tension of the rubber band. It will be noted that the rear edge of the wing 11 is slightly lower than the front edge, whereas the rear edge of the elevator 12 is somewhat higher than its front edge. The reason for this difference will be discussed below.

Preferably the slot is narrow only at its forward edge, becoming gradually wider as it approaches the tail 14. This construction permits of a ready insertion of the wing in the slot 16, insures of the front edge of the wing being held firmly in place by being wedged in the slot, whereas the rear edge of the wing is held only by the rubber band 17. If one end of the wing should then strike an obstruction during flight, the wing could readily pivot about the center of its front edge, absorbing the shock instead of suffering damage as would be very probable if the wing were held rigidly in place on the fuselage.

In the alternative embodiment of Figure 4, the wing 11, instead of being mounted within a slot in the fuselage, rests directly on the curved surface 15 formed on the upper edge of the fuselage 10. Since the wing 11 is deprived of the support given it by the narrow slot in the first mentioned embodiment, a supporting member 18 of stiff wire is cemented to the front edge of the wing 11. This supporting member 18 is formed with parallel faces 19, 20 adapted to embrace the sides of the fuselage 10 and prevent the wing from tilting laterally on the fuselage. The wing 11 is held against the surface 15 by a rubber band 17 as before. The operation of this embodiment is the same as that of the preferred embodiment shown in Figure 1 and Figure 2 and described above, except that the fixed position of the supporting member 18 on the wing 11 makes a lateral adjustment of the wing impossible.

The glider shown in Figure 1 is operated by adjusting the wing 11 in the slot 16 of the fuselage 10 so that the wing projects an equal distance on either side of the fuselage, that is, so that the wing is symmetrically disposed with reference to the fuselage, and preferably about halfway between the extreme positions A and C indicated in Figure 2, say in position B. The glider is then launched by throwing it in the air. If a more powerful impulse or a higher initial velocity is desired, a catapult may be employed, or a stout rubber band may be looped in the notch 21 in the nose of the fuselage 10 and stretched with one hand while the tail 14 is held with the other and suddenly released.

When launched with a sufficiently high velocity the glider is capable of flying for a considerable distance being sustained by the reaction of the air against the slightly inclined surface of the wing 11. The tendency of the nose to drop, due to the fact that the center of gravity is forward of the center of the wing, is overcome by the elevator 12, which, as is stated above, has a negative angle, and is therefore forced downward by the reaction of the air to an extent sufficient to maintain the glider nearly horizontal in normal flight. This arrangement has been found to give rise to a high degree of flying stability.

If it is desired to execute simple maneuvers at a low speed the wing 11 is moved forward, say to the position A of Figure 2. At this position the curve of the wing is reduced almost to zero, its effective angle is reduced so that it is more nearly parallel to the elevator 12 and the center of the wing is close to the center of gravity. If on the other hand, high speed maneuvers are to be executed, particularly such as loops or spirals, the wing is moved back, say to the position C of Figure 2. At this position the curve of the wing and its effective angle are a maximum and its center is farthest removed from the center of gravity. In this position the extreme angle between the wing surface and the elevator is well adapted to the execution of vertical circles such as ordinary loops, but if the speed in a straight glide is too far reduced, the flight will resolve itself into a series of dips and glides.

If it is desired to execute horizontal circles, or banking maneuvers, the wing may be shifted laterally, or may even be turned so that one wing tip is closer to the nose than the other. In this manner circles of any desired radius can be described with the utmost ease, particularly by a combination of the lateral adjustment with the adjustment along the curved surface 15 as described above.

It is evident therefore that the objects of the invention have been accomplished, and that an aircraft capable of manifold adjustments to adapt it to perform almost any desired maneuver has been provided.

This invention is not limited to the motorless model glider described herein, for the adjustable wing is clearly applicable in like manner to aircraft provided with independent motor power. It is therefore not intended to limit this invention except as may be made necessary by the prior art, and as indicated in the appended claims.

I claim:

1. An aircraft comprising a fuselage, a downwardly curved surface of continuously changing curvature on said fuselage, and a flexible wing mounted in contact with said surface and movable thereon in a forward and backward direction, whereby the effective angle and the curvature of the wing are simultaneously changed as it is moved on the fuselage.

2. An aircraft comprising a fuselage, a surface on said fuselage inclining downward toward the rear with a continuously increasing curvature, a flexible wing mounted in contact therewith and movable thereon in a forward and backward direction, whereby the effective angle and the curvature of the wing are simultaneously increased as the wing is moved to the rear.

3. An aircraft according to claim 2, in which the front edge of the wing is firmly held against lateral displacement, but the rear edge is held by friction only and is capable of displacement by excessive stresses.

4. An aircraft comprising a fuselage, a surface on said fuselage inclining downward toward the rear with continuously increasing curvature, a flexible wing mounted in contact therewith and movable thereon both laterally and in a forward and backward direction, the center of the wing being to the rear of the center of gravity of the aircraft, and an elevator inclined upwardly toward the rear.

In witness whereof I have hereunto subscribed my name.

PHILIP R. TARR.